US006310907B1

(12) United States Patent
Tsujimoto

(10) Patent No.: US 6,310,907 B1
(45) Date of Patent: Oct. 30, 2001

(54) SPREAD SPECTRUM DIVERSITY TRANSCEIVER

(75) Inventor: Ichiro Tsujimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/205,710

(22) Filed: Dec. 4, 1998

(30) Foreign Application Priority Data

Dec. 4, 1997 (JP) .................................................. 9-349948

(51) Int. Cl.[7] ................................. H04K 1/00; H04B 7/02
(52) U.S. Cl. ........................................... 375/141; 375/267
(58) Field of Search .................................... 375/130, 140, 375/141, 146, 147, 267, 295, 299, 316, 347, 340, 219; 455/101, 132, 133, 134, 135, 137; 370/208, 342; 714/781, 786

(56) References Cited

FOREIGN PATENT DOCUMENTS

| 0 722 227 A1 | * | 7/1996 | (EP) . |
| 0 989 688 A2 | * | 3/2000 | (EP) . |
| 7-143101 | | 6/1995 | (JP) . |
| 8-191289 | | 7/1996 | (JP) . |

* cited by examiner

Primary Examiner—Tesfaldet Bocure
(74) Attorney, Agent, or Firm—McGinn & Gibb, PLLC

(57) ABSTRACT

A spread-spectrum transceiver using a combination of time diversity and error-correction is disclosed. An error-correcting encoder encodes N-branch time-diversity signals to produce M-branch transmission signals consisting of N-branch information-bit signals and (M–N)-branch check-bit signals. The M-branch transmission signals are transmitted according to spread-spectrum system. At a receiving side, an error-correcting decoder decodes the M-branch received signals to produce N-branch time-diversity signals. After canceling the delay differences between the N-branch time-diversity signals, a received information signal is determined from the N received information signal according to majority logic.

23 Claims, 8 Drawing Sheets

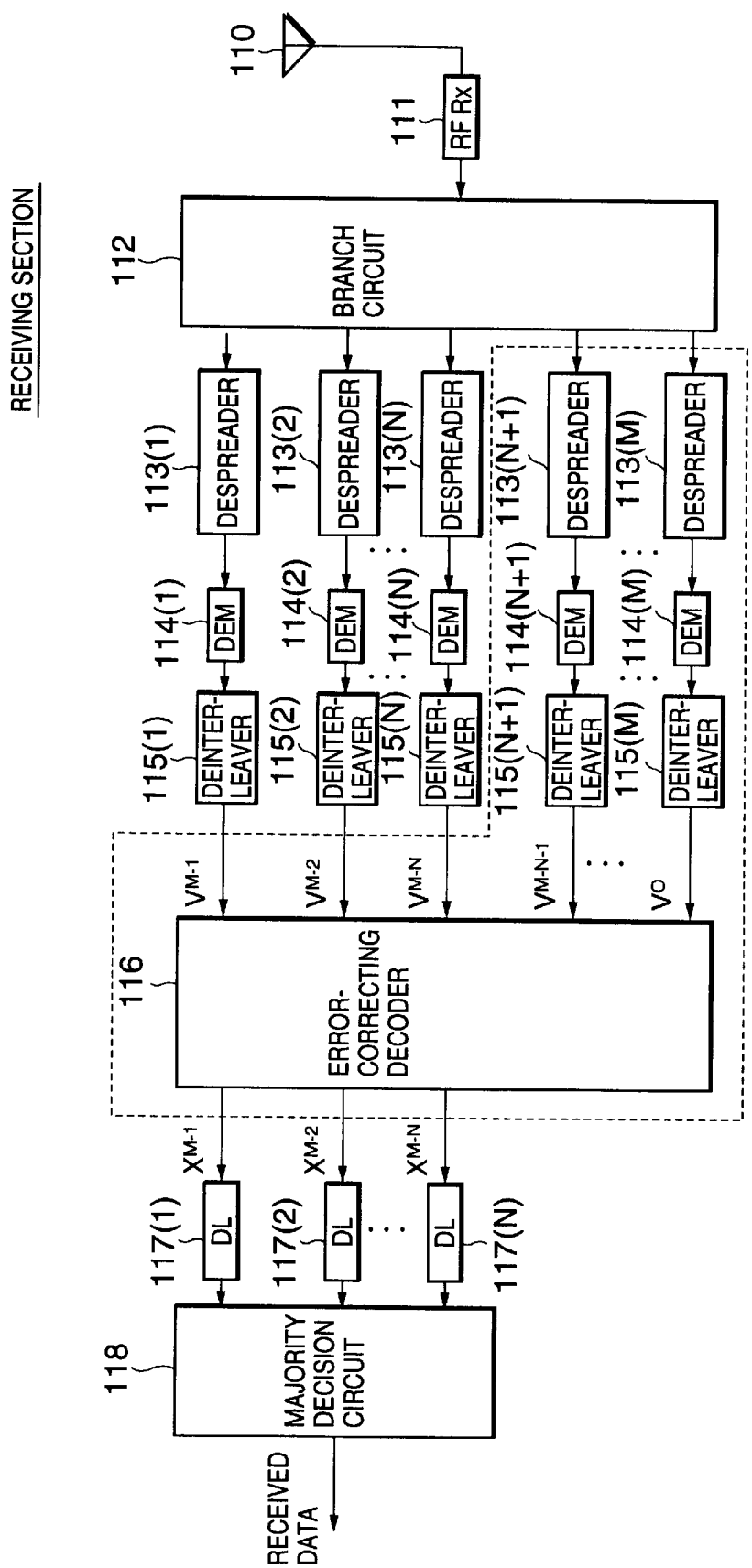

SPREAD SPECTRUM DIVERSITY TRANSCEIVER

BACKGROUND OF THE INVENTION

1. Field of the Invention

The present invention relates to a spread-spectrum system, and more particularly to a spread spectrum diversity transceiver making use of code-division multiplexing, time-diversity, and error-correcting decoding, especially in digital radio transmission having difficulties in multipath fading.

2. Description of Related Art

Regarding a diversity system to be applied to digital communication, there has been disclosed a diversity system for preventing losses of data caused by fading in Japanese Patent Application Laid-open Publication No. 07-143101 (hereinafter, to be referred to as a first publication).

According to this first publication, after a predetermined length of transmission data has been coded into a code by an error-correcting encoder, the bit information of the code is transmitted simultaneously through a plurality of channels formed by transmitters of different frequencies and a transmission antenna.

At a receiver side, the bit information of the above one code is received simultaneously by a plurality of receivers through a receiving antenna and the received code information is subjected to error-correcting and decoding by an error-correcting decoder.

In such a radio transmission under channel fading, as described above, diversity receiving is usually necessary. Fading is broadly classified into frequency-nonselective (flat) fading and frequency-selective fading. The flat fading involves no occurrence of multipath propagation but directly causes variations in amplitude and phase of a receiving wave itself in the middle of its propagation. On the other hand, the frequency-selective fading involves an occurrence of multipath propagation and independently causes variations in amplitude and phase of each of a plurality of arrival waves due to multipath.

In the case of frequency-selective fading, a receiving signal becomes a combined wave of a plurality of multipath waves and, therefore, the received signal may have an inverse phase combination in a certain frequency depending on the status of phase variation. In other words, frequency-selective fading (a notch) occurs in the received spectrum.

On the other hand, in the case of flat fading, variations in the received signal level become a problem and the received waveform itself is not distorted. However, in the case of the frequency-selective fading by multipath, there occurs a distortion in the received waveform in addition to the variations in the received signal level.

For the above-described fading channel, there have been conventionally used diversity receiving and adaptive equalizer techniques. There are various types of system available for the diversity receiving and the adaptive equalizer technique. A spread spectrum technique which is considered to be effective for a multipath distortion will be explained below as an example of a prior-art technique.

The spread spectrum communication has so far been used for military purpose to achieve robust communication against interference waves.

In the case of multipath waves with a long delay time, however, correlation with a desired wave is reduced. In this case, if the spread spectrum technique is applied, a multipath wave is not correlated with a spreading code and is suppressed by a despreading operation. In other words, it can be said that the spread spectrum is a kind of an equalizer for regarding a multipath wave as an interference wave as well. However, a multipath wave with a short delay time has high correlation with the desired wave and this multipath wave cannot be suppressed easily by the despreading.

In this case, when there exists an inverse phase relation between the multipath wave and the desired wave, a signal level might be lowered or a fade-out could occur. In order to cope with such a fade-out, diversity receiving making use of non-correlation of a plurality of propagation paths becomes essential.

Referring to FIG. 1A, it is assumed that a transmitter 10 carries out transmission by using one non-directional antenna and a receiver 11 receives multipath propagating waves. Let us consider a model where multipath propagation occurs in which a wave radiated from the non-directional antenna of the transmitter 10 is propagated directly through a diversity path 12 and through diversity paths 13 and 14 including a reflection respectively.

FIGS. 1B–1D show variations of receiving electric field levels of the case where waves propagated through the diversity paths 12 to 14 respectively are received by the receiver 11. More specifically, variations in the received electric field of the waves that have propagated through each diversity path, that is, through the diversity path 13 in case of FIG. 7, through the diversity path 12 in case of FIG. 8, and through the diversity path 14 in case of FIG. 9, respectively, where the horizontal axis shows time and the vertical axis shows the levels of received electric fields or received power. In this case, since the propagation paths are different from each other in space, each fading becomes independent and the respective received signal levels vary as shown in FIGS. 1B to 1D.

In this model, the diversity receiving is performed by selecting or combining non-faded-out portions of the respective diversity branches to thereby reduce probabilities of fade-out.

The diversity like this is called a space diversity or a path diversity as the diversity utilizes non-correlation of the propagation paths. As a means for achieving this path diversity, an adaptive array using a plurality of antennas is usually employed. In other words, it is possible to achieve diversity combining by extracting a plurality of multipath arriving waves and performing maximum-ratio combining by the directional control of the adaptive array.

In general, however, the space diversity requires a plurality of antennas and is disadvantageous in cost. Particularly, in microwave communication, the number of antennas cannot be increased easily as the costs of antennas are high and a large-scale apparatus is required.

In order to improve the drawbacks of this space diversity, there has been disclosed a diversity system utilizing the spread spectrum code multiplexing and the time diversity in Japanese Patent Application Laid-open Publication No. 08-191289 (hereinafter to be referred to as a second publication).

This prior-art technique will be explained with reference to FIGS. 2A and 2B.

Referring to FIG. 2A, in a transmitter, transmission data is input to an error-correcting encoder 21 and the corded data is branched into N branches. The coded data is input to an interleaver 23(1) and is also input it interleavers 23(2)–23(N) through delay elements 22(1)–22(N-1) each providing the corresponding branch with a different delay.

The N-branch data with the delay step are independently interleaved by the interleavers 23(1)–23(N) and then the respective interleaved data are modulated by modulators 24(1)–24(N). Output signals of the modulators 24(1)–24(N) are sent to spectrum spreaders 25(1)–25(N), respectively. After having been spectrum-spread by the spreaders 25(b 1)–25(N), the N-branch signals of the same frequency band are output to a combiner 26.

The combiner 26 combines the N-branch signals into a code-multiplexed signal, which is converted into radio frequency by a radio transmitter 27. The radio-frequency signal is then transmitted as a radio wave through a transmission antenna 28.

Referring to FIG. 2B, in a receiver, a radio signal received by a receiving antenna 29 is input to a radio receiver 30, which converts the radio-frequency received signal into the spectrum-spreading frequency band. Then, the received signal is branched into N branches by a branch circuit 31. The N-branch received signals are input to despreaders 32(1)–32(N) corresponding to the N transmitting branches.

After have been spectrum-despread by the despreaders 32(1)–32(N) the respective signals are domodulated by demodulators 33(a)–33(N) and then the demodulated signals are deinterleaved by N deinterleavers 34(1)–34(N) in N branches. The received data obtained by the above process are output to delay elements 35(1)–35(N), respectively, so that the predetermined delay differences applied at a transmitting side are removed to produce N-branch received data with the same timing.

The N-branch received data passed through the delay elements 35(1)–35(N) are sent to a majority decision circuit 36. The majority decision circuit 516 has made a majority decision of the N-branch received data to produce error-corrected data. The error-corrected data is sent to an error-correcting decoder 37, which finally corrects errors of the error-corrected data to produce received data.

In the case of the conventional diversity system disclosed in the second publication, not only burst errors due to multipath fading or the like is randomized by interleaving, but also time diversity is carried out by delay processing, so that the channel can be improved even when fading occurs.

However, the combining of diversity branches is performed based on majority decision of the branches. For example, in the case of ten branches, if three branches show "1" of digital signal and the remaining seven branches show "0" of digital signal, then the majority decision circuit 36 decides "0".

However, there is a problem that if the number of branches showing "1" is five and the number of branches showing "0" is also five, a decision cannot be made as to which one is correct.

Further, as the error probabilities of the branches are random, there is also a possibility that a majority of branches take "0" despite a fact that "1" is a correct signal. In this case, the majority decision circuit 36 simply decides "0" of the majority and outputs this as correct.

SUMMARY OF THE INVENTION

It is an object of the present invention to provide a spread-spectrum diversity transceiver and a communication system that can achieve the improved quality of communication with the reduced amount of hardware.

It is another object of the present invention to provide communication method and system, which can reduce in bit error rate in a communication channel subject to hit or the like due to multipath fading.

It is still another object of the present invention to provide a spread spectrum diversity transceiver and communication system, which can reduce the number of bits for error correction with ensuring the quality of a channel by diversity itself, resulting in effective use of frequencies.

According to an aspect of the present invention, a spread-spectrum transceiver including an error-correcting encoder and an error-correcting decoder. The error-correcting encoder encodes time-diversity signals in N branches to produce transmission signals in M (M>N) branches. The error-correcting decoder decodes the received signal in M branches to produce time-diversity signals in N branches.

The transmitting section of the spread-spectrum transceiver includes a first delay circuit for delaying a transmission signal with N (N is a positive integer: N>1) different delays to produce N-branch information signals, an error-correcting encoder for generating M-branch (M is an integer: M>N) transmission signals from the N-branch information signals and N-bit parallel transmission data of the N-branch information signals, a spreader for producing M-branch spread-spectrum transmission signals using different spreading codes based on the M-branch transmission signals, respectively, and a radio transmitter for transmitting a code-division multiplex signal obtained by combining the M-branch spread-spectrum transmission signals.

The receiving section thereof includes a radio receiver for receiving a radio signal to produce M received signals, a despreader for producing M-branch received signals from the M received signals using the different spreading codes, an error-correcting decoder for generating N-branch received information signals based on the M-branch received signals, a second delay circuit for delaying the N-branch received information signals to cancel the different delays of the N-branch received information signals to produce N received information signals, and a determiner for determining a received information signal from the N received information signals.

The error-correcting encoder may include a check-bit generator for generating (M–N)-bit check data from the N-bit parallel transmission data of the N-branch information signals, and a third delay circuit for delaying the N-branch information signals to concurrently generate the N-bit parallel transmission data and the (M–N)-bit check data to produce the M-branch transmission signals.

The error-correcting decoder may include a syndrome calculator for calculating a syndrome from M-bit parallel data of the M-branch received signals, an error-pattern generator for generating an error pattern depending on the syndrome, and an error corrector for correcting N-bit parallel information data of the M-bit parallel data based on the error pattern to produce the N-branch received information signals.

The determiner may include a majority decision circuit for determining the received information signal based on a majority logic of the N received information signals.

According to another aspect of the present invention, at a transmitting side, a transmission signal is delayed with N (N is a positive integer: N>1) different delays to produce N-branch information-bit signals. Subsequently, K-branch (K is a positive integer: K>1) check-bit signals are generated from the N-branch information-bit signals. Then M-branch (M =N+K) signals consisting of the N-branch information-bit signals and the K-branch check-bit signals are transmitted.

At a receiving side, the M-branch signals are received from the transmitting side and the N-branch information-bit signals are reproduced from the M-branch signals using the K-branch check-bit signals. After canceling the different delays of the N-branch information signals to produce N information signals, a received information signal is determined from the N information signals.

The K-branch check-bit signals may be generated by dividing a message polynomial M(X) representing N-bit information parallel data of the N-branch information-bit signals by a generator polynomial G(X).

The N-branch information-bit signals may be reproduced by calculating a syndrome from M-bit parallel data of the M-branch signals, generating an error pattern depending on the syndrome, and then correcting N-bit parallel information data of the M-bit parallel data based on the error pattern to produce the N-branch information-bit signals.

BRIEF DESCRIPTION OF THE DRAWINGS

FIG. 7 is a block diagram for showing a circuit of a receiver in a spread spectrum diversity transceiver according to the second embodiment of the present invention.

DETAILED DESCRIPTION OF THE PREFERRED EMBODIMENTS

Figure 3:
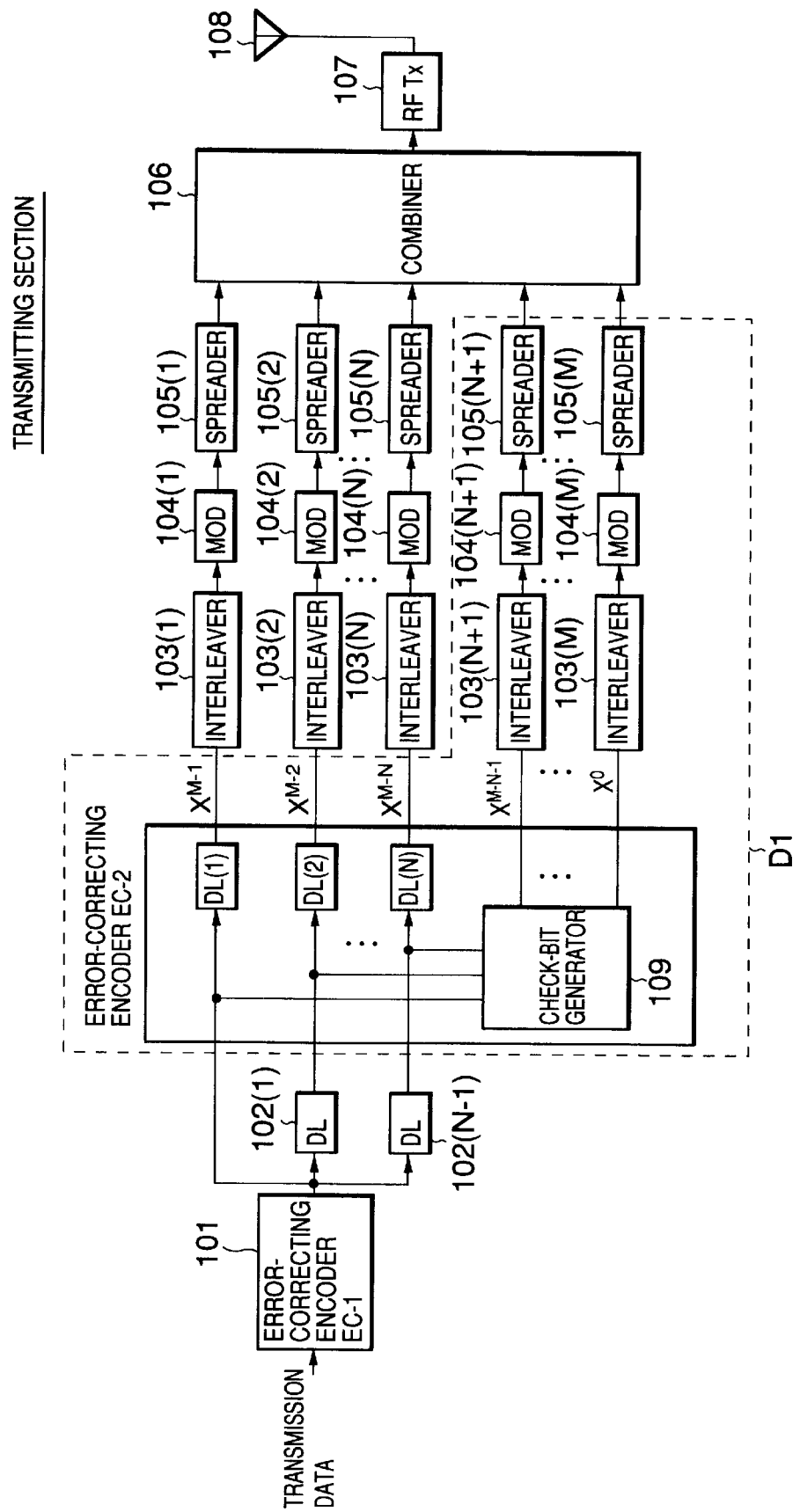
FIG. 3 is a block diagram for showing a circuit of a transmitter in a spread spectrum diversity transceiver according to a first embodiment of the present invention.

Referring to FIG. 3, a string of transmission data is input to an error-correcting encoder (EC-1) 101 as a first error-correcting coding means. The transmission data is subjected to error-correcting encoding carried out by the error-correcting encoder 101. The encoded transmission data is branched into N branches, where N is a positive integer.

The first branch output data of the error-correcting encoder 101 is output directly to an error-correcting encoder EC-2 which is a second error-correcting encoding means. The second branch output data of the error-correcting encoder 101 is output to the an error-correcting encoder EC-2 through a delay element 102(1). Similarly, the respective output data of 3rd to (N-1)-th branches of the error-correcting encoder 101 are output to the error-correcting encoder EC-2 through delay elements 102(2)–102(N-1). The respective delay elements 102(1)–102(N-1) provide the corresponding branches with different delays. Therefore, the encoded data output from the error-correcting encoder 101 is delayed with different delays to produce N-branch encoded data, which are output to the error-correcting encoder EC-2.

The error-correcting encoder EC-2 includes N delay elements DL(b 1)–DL(N), which receive the N-branch encoded data and produce N-branch data $X^{M-1}$–$X^{M-N}$ (M is an integer greater than N). Further, the error-correcting encoder 109 includes a check-bit generator 109, which receives the N-branch encoded data and produces new (M–N)-branch check-bit data $X^{M-N-1}$–$X^0$. Therefore, the error-correcting encoder 109 produces M-branch encoded data $X^{M-1}$–$X^0$ from the N-branch encoded data. The delay elements DL(1)–DL(N) delay the N-branch encoded data with the delay time required in the check-bit generator 109.

The N-branch data $X^{M-1}$–$X^{M-N}$ obtained by the delay elements DL(1)–DL(N) are output to interleavers 103(1)–103(N) and the new (M–N)-branch check-bit data $X^{M-N-1}$–$X^0$ are output to interleavers 103(N+1)–103(M).

The M-branch encoded data $X^{M-1}$–$X^0$ are independently interleaved by the interleavers 103(1)–103(M) and then the respective M-branch interleaved data are modulated by modulators 104(1)–104(M). M-branch output data of the modulators 104(1)–104(M) are sent to spectrum spreaders 105(1)–105(M), respectively. After having been spectrum-spread by the spreaders 105(1)–105(M), the M-branch data of the same frequency band are output to a combiner 106.

The combiner 106 combines the M-branch data into a multiplex signal, which is converted into radio frequency by a radio transmitter 107. The radio-frequency signal is then transmitted as a radio wave through a transmission antenna 108.

Figure 1A:
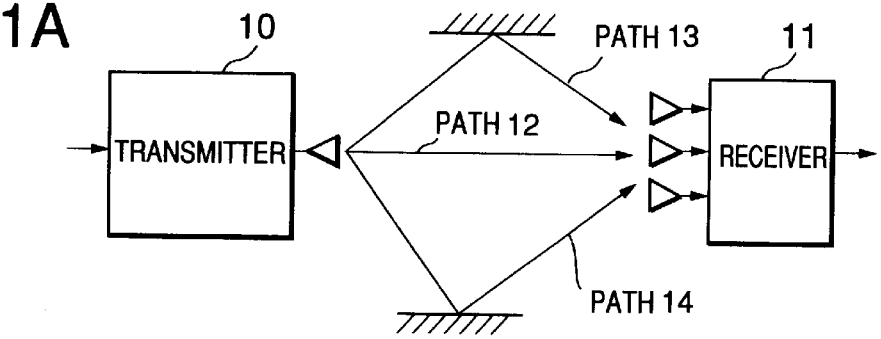
FIG. 1A is a schematic diagram showing an example of multipath propagation occurrence.
Figure 1B:
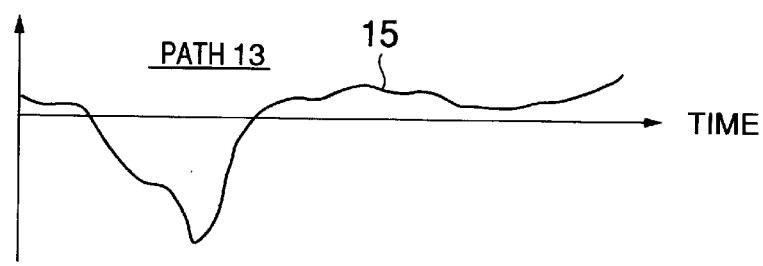
FIG. 1B is a diagram showing variations of a receiving electric field level with respect to time in the case of a diversity path 13 of FIG. 1A.
Figure 1C:
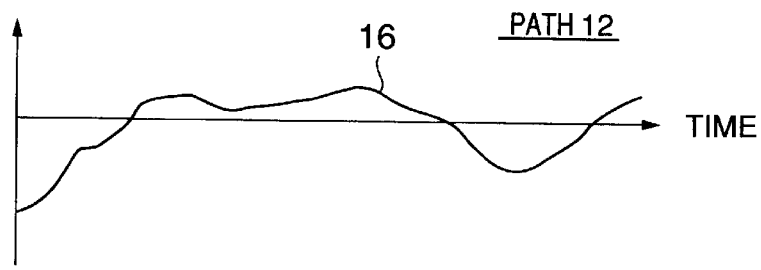
FIG. 1C is a diagram showing variations of a receiving electric field level with respect to time in the case of a diversity path 12 of FIG. 1A.
Figure 1D:
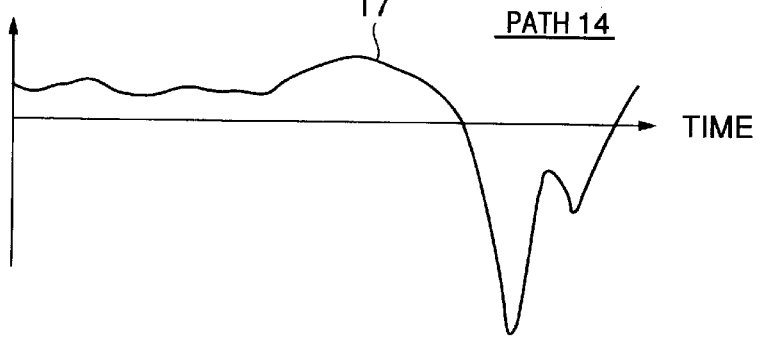
FIG. 1D is a diagram showing variations of a receiving electric field level with respect to time in the case of a diversity path 14 of FIG. 1A.
Figure 2A:
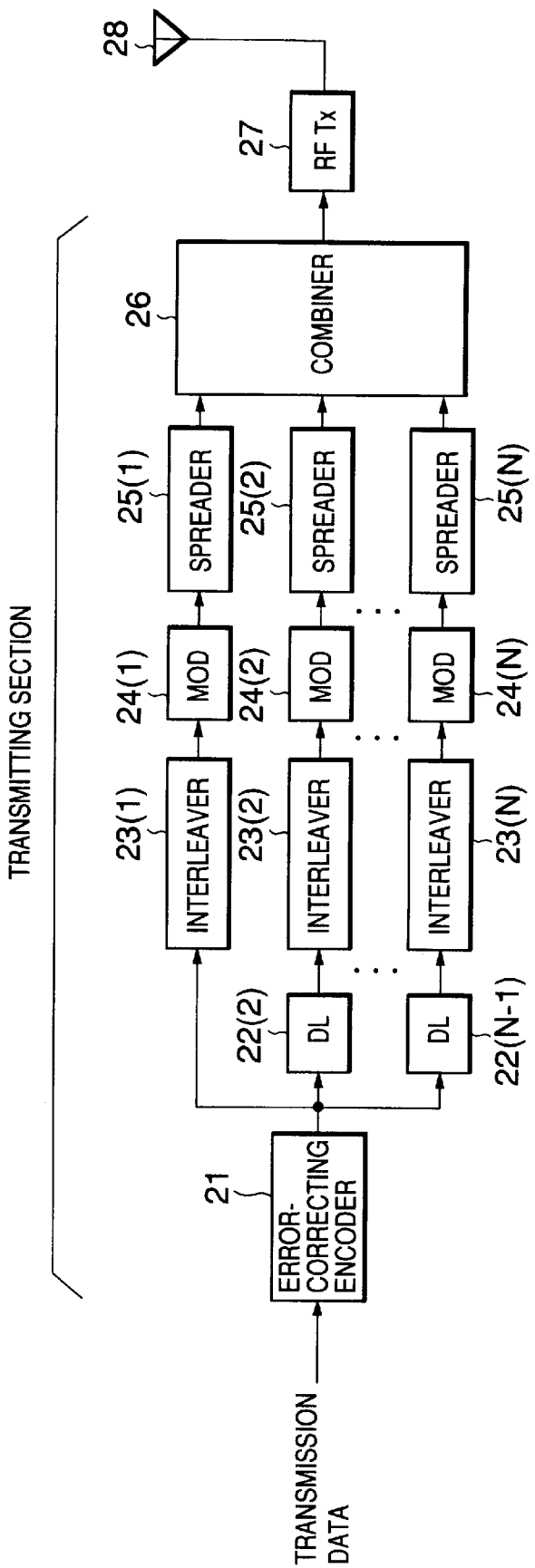
FIG. 2A is a block diagram for showing a circuit of a transmitter in a conventional diversity system.

Compared with the conventional transmitter as shown in FIG. 2A, a new circuit surrounded by a broken line D1 is added to the conventional transmitter to form the circuit configuration of the transmitting section according to the first embodiment.

Figure 4:
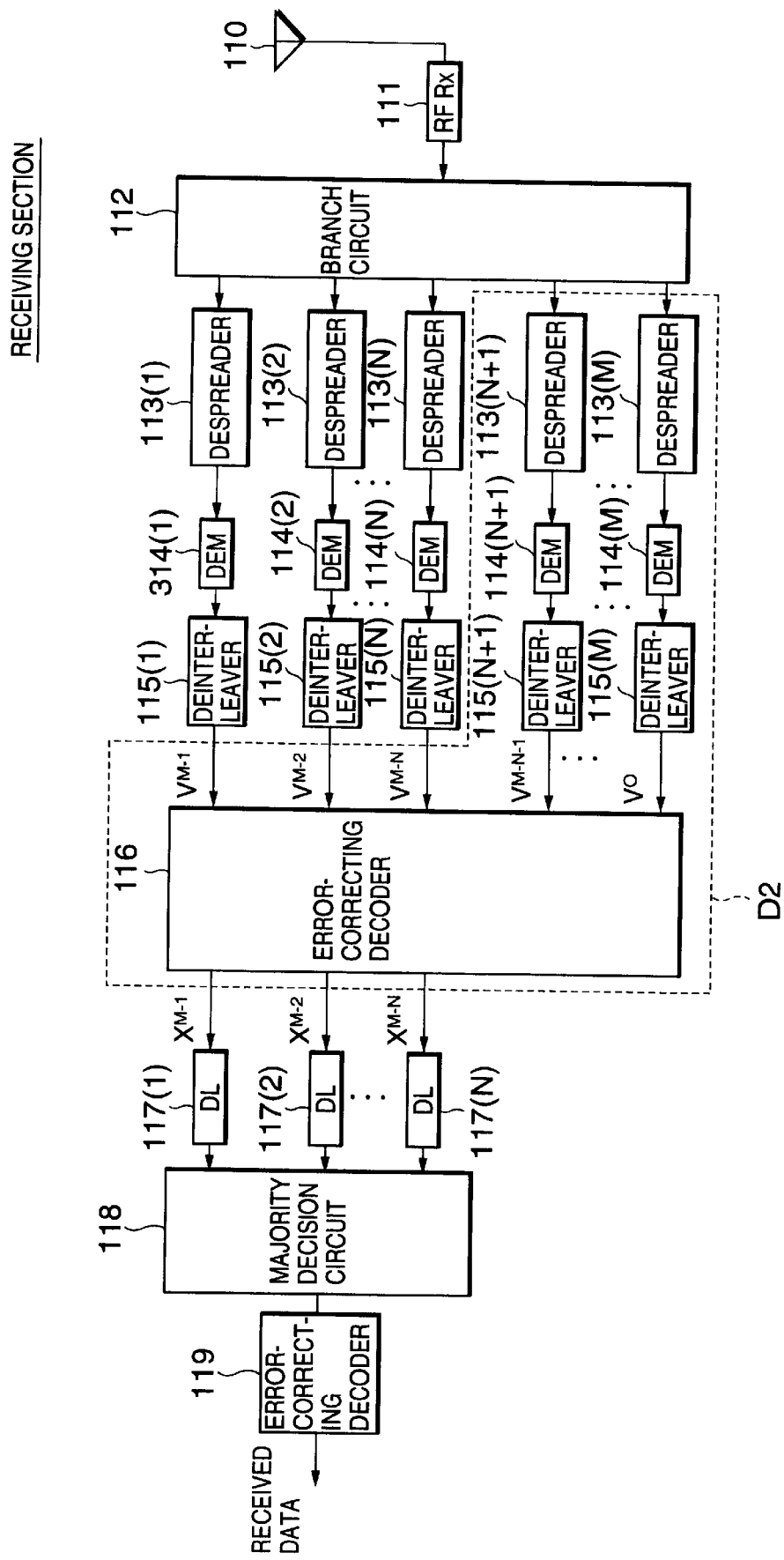
FIG. 4 is a block diagram for showing a circuit of a receiver in a spread spectrum diversity transceiver according to the first embodiment of the present invention.

Referring to FIG. 4, a radio signal received by a receiving antenna 110 is input to a radio receiver 111, which converts the radio-frequency received signal into the spectrum-spreading frequency band. Then, the received signal is branched into M branches by a branch circuit 112. The M-branch received signals are input to despreaders 113(1)–113(M) corresponding to the M receiving branches.

After have been spectrum-despread by the despreaders 113(1)–113(M), the respective signals are demodulated by demodulators 114(1)–114(M) and then the demodulated signals are deinterleaved by M deinterleavers 115(1)–115(M) to produce M-branch data $V^{M-1}$–$V^{M-N}$ and $V^{M-N-1}$–$V^0$. The M-branch data $V^{M-1-VM-N}$ and $V^{M-N-1}$–$V^0$ are output to an error-correcting decoder 116, which produces N-branch data $M^{M-1-MM-N}$ from the M-branch data $V^{M-1-VM-N}$ and $V^{M-N-1}$–$V^0$.

The N-branch data $M^{M-1-MM-N}$ are output to delay elements 117(1)–117(N), respectively, so that the predetermined delay differences applied at a transmitting side are canceled to produce N-branch received data with the same timing.

The N-branch received data passed through the delay elements 117(1)–117(N) are sent to a majority decision circuit 118. The majority decision circuit 118 has made a majority decision of the N-branch received data to produce combined data. The combined data is sent to an error-correcting decoder 119, which finally corrects errors of the combined data to produce received data.

Figure 2B:
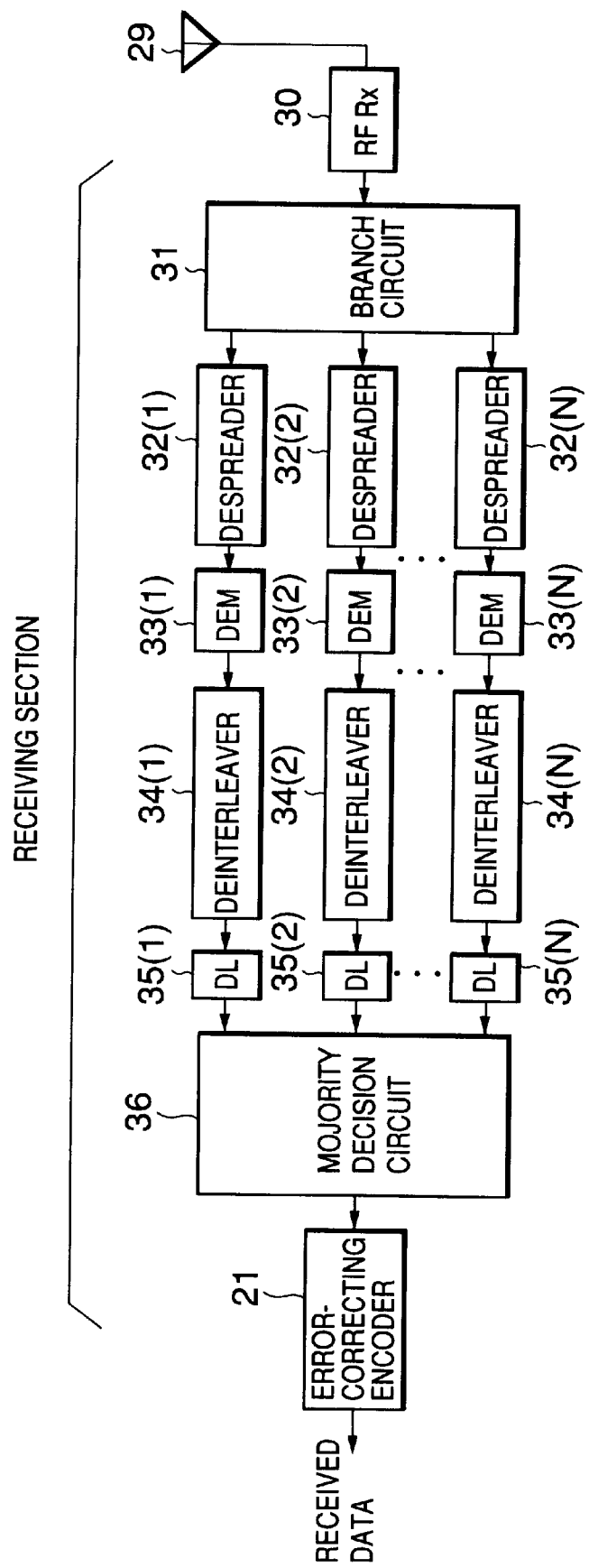
FIG. 2B is a block diagram for showing a circuit of a receiver in a conventional diversity system.

Compared with the conventional receiving section as shown in FIG. 2B, the structure of the receiving section according to the first embodiment includes a portion surrounded by a broken line D2 as a circuit newly added to the conventional receiving section.

Figure 5:
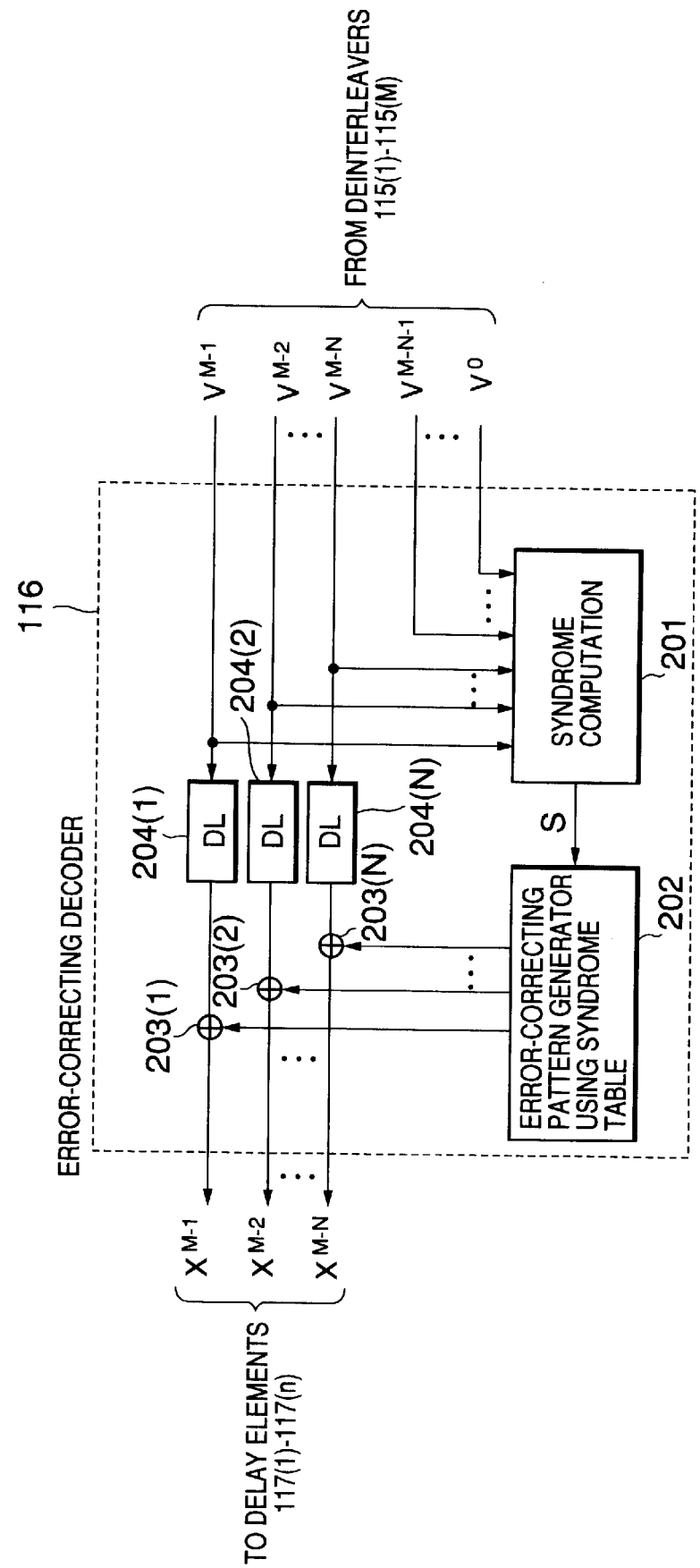
FIG. 5 is a block diagram for showing an example of an error-correcting decoder in the receiver of FIG. 4.

Referring to FIG. 5, the error-correcting decoder 116 is provided with a syndrome computation section 201 and an error-correcting pattern generator 202. The syndrome computation section 201 receives the M-branch data $V^{M-1}$–$V^{M-N}$ and $V^{M-N-1}$–$V^0$ from the deinterleavers 115(1)–115(M) and performs syndrome computation to output the syndrome S to the error-correcting pattern generator 202. According to the syndrome S, the error-correcting pattern generator 202 generates an error-correcting pattern consisting of error-correcting bits, which are each output to exclusive ORs 203(1)–203(N). The N-branch data $V^{M-1}$–$V^{M-N}$ are also input to N delay elements 204(1)–204(N) and the delayed N-branch data $V^{M-1}$–$V^{M-N}$ are output to the exclusive ORs 203(1)–203(N), respectively. The exclusive ORs 203(1)–203(N) output the M-branch error-corrected data $X^{M-1}$–$X^{M-N}$ to the delay elements 117(1)–117(N).

The error-correcting pattern generator 202 has a syndrome table having syndromes as addresses recorded in advance in a storage means such as a read-only memory (ROM) or the like. The error pattern corresponding to an input syndrome is output as an error-correcting pattern to the exclusive ORs 203(1)–203(N).

The operation of the first embodiment having the above-described structure will be explained below. The first embodiment does not employ a frequency diversity expanding a frequency band or a space diversity depending on multipath propagation, but employs in combination a time diversity using code-multiplexing, burst error-correcting using interleaving, majority logic and interbranch error-correcting.

The operation of the transmitting section will be described hereinafter referring to FIG. 3.

The transmission data having burst errors caused by hits or the like due to multipath fading is subjected to error-correcting coding by the error-correcting encoder 101. The error-corrected data passes through the delay elements 102(1)–102(N-1) to produce N-branch data. The respective delay elements 102(1)–102(N-1) provide different delays. Therefore, the respective different delays are given to the transmission data for N branches. Such independently delayed N-branch data can be used to achieve the time diversity having delay times between branches. By this delay processing, time correlation between branches is reduced.

In the error-correcting encoder EC-2, the delay elements DL(1)–DL(N) delays the N-branch data. The check-bit generator 109 receives the N-branch data in parallel as N-bit data and produces new branch data $X^{M-N-1}$–$X^0$ as in the case of data error-correcting of block codes. In this manner, the error-correcting encoder EC-2 produces the M-branch parallel data defined as $(X^{M-1}, X^{M-2}, \ldots, X^{M-N}, X^{M-N-1}, \ldots, X^0)$ in order of descending degree. In this case, $X^{M-1}$ to $X^{M-N}$ each correspond to the degrees of a polynomial representing information bits. Similarly, $X^{M-N}$ to $X^0$ each correspond to the degrees of a polynomial representing the check bits. In other words, assuming that the parallel output data of the error-correcting encoder EC-2 is a data block, the parallel output data can be regarded as an error-correcting block code having degree M.

When the information bits are represented by a message polynomial M(X) and the generator polynomial is represented as G(X) according to the error-correcting technique, the message polynomial M(X) is represented by the following expression (1):

$$M(X)=Q(X).G(X)+R(X) \quad (1)$$

where Q(X) denotes a quotient and R(X) denotes a remainder. When R(X) is (modulo-2) added to both sides of the expression (1), the following expression (2) is obtained:

$$M(X)+R(X)=Q(X) . G(X) \quad (2)$$

This expression (2) is divisible by the generator polynomial G(X). In other words, the expression (2) is used as transmission data U(X) as shown in the following expression (3) and the data U(X) is transmitted:

$$U(X)=M(X)+R(X)=Q(X).G(X) \quad (3)$$

When a bit error pattern E(X) is added to the transmission data U(X) of the above expression (3), the received data V(X) can be expressed by the following expression (4) (the operation of the receiving section will be explained later):

$$V(X)=U(X)+E(X) \quad (4)$$

The above reception data V(X) divided by the generator polynomial G(X) gives the following expression (5):

$$V(X)/G(X)=\{U(X)+E(X)\}/G(X) =Q(X)+E(X)/G(X) \quad (5)$$

In this expression (5), when E(X)=0, that is, when there is no occurrence of bit error, no remainder is generated in the above expression (5). However, when E(X)≠0, that is, when there is an occurrence of bit error, a remainder E(X)/G(X) occurs in the expression (5).

A remainder obtained by dividing the bit error pattern E(X) by the generator polynomial G(X) is generally referred to as a syndrome pattern. Syndrome patterns are in a one-to-one correspondence with error patterns E(X). Accordingly, it is possible to specify the error pattern E(X) by obtaining a syndrome at the receiving section. Thus, the error-correcting becomes possible.

Based on the above-described error-correcting principle, the check-bit generator 109 of the error-correcting encoder EC-2 of FIG. 3 divides the message polynomial M(X) of the information bits by the generator polynomial G(X), and outputs the remainder R(X) as the check bits ($X^{M-N-1}$, $X^{M-N-2}$, ..., $X^0$) to the interleavers 103(N+1) to 103(M).

The check bit generation requires a certain constant period of time η. In order to mach the timing of the check bits with the information bits, the data of the information bits are input to the N delay elements DL(1)–DL(N) for adjusting the delay at the side of information bits.

Accordingly, the M-branch data output by the error-correcting encoder EC-2 is used as M-bit transmission data and this corresponds to the transmission data of the above expression (3). The M-bit transmission data ($X^{M-1}, X^{M-2}, X^{M-N}, \ldots, X^0$) are output to the interleavers 103(1)–103(N) and 103(N+1)–103(M).

In this case, the interleavers 103(1)–103(N), the modulators 104(1)–104(N), the spreaders 105(1)–105(N), the combiner 106, the radio transmitter 107 and the transmission antenna 108 correspond to the interleavers 23(1)–23(N), the modulators 24(1)–24(N), the spreaders 25(1)–25(N), the combiner 26, the radio transmitter 27 and the transmission antenna 28 of the prior-art example shown in FIG. 2A, respectively.

The interleavers 103(1)–103(N), the modulators 104(1)–104(N), the spreaders 105(1)–105(N), the combiner 106, the radio transmitter 107 and the transmission antenna 108 of the first embodiment are different from those of the prior-art example in that the (M−N)-bit check bit data are added to the N-bit information data and thus a signal processing is carried out for the M branches.

In conventional error-correction, a string of input data are stored in a shift register or the like and are processed as block data. However, according to the first embodiment, input data for a plurality of branches are processed as block data. This is called a diversity inter-branch error-correcting or an inter-branch error-correcting.

Referring to FIG. 4, in the receiving section, a radio signal wave received by the receiving antenna 110 is input to the radio receiver 111. The radio receiver 111 frequency—converts the received signal from a radio frequency band to a spectrum-spread signal band and the converted signal is output to the branch circuit 112.

The branch circuit 112 divides the received signal into M branches. The M-branched received signals are input to the M despreaders 113(1)–113(N) and 113(N+1)–113(M). The despreaders 113(1)–113(N) and 113(N+1)–113(M) each carry out the spectrum despreading of the respective received signals to demultiplex the received code-division multiplex wave.

Output signals of the M-branched despreaders 113(1)–113(N) and 113(N+1)–113(M) are sent to the demodulators 114(1)–114(N) and 114(N+1)–114(M), respectively. The demodulators 114(1)–114(N) and 114(N+1)–114(M) carry out demodulation of the respective signals corresponding to the primary modulation carried out by the modulators 104(1)–104(N) and 104(N+1)–104(M) in the transmitting section. Demodulated signals are sent to the M deinterleavers 115(1)–115(N) and 115(N+1)–115(M), respectively. The deinterleavers 115(1)–115(N) and 115(N+1)–115(M) carry out the deinterleaving corresponding to the interleaving of the interleavers 105(1)–105(N) and 105(N+1)–105(M) in the transmitting section to produce the received M-branch data $V^{M-1}, V^{M-2}, \ldots, V^{M-N}, V^{M-N-1}, \ldots,$ and $V^0$.

The receiving operation as described above is different from that of the prior-art receiving section as shown in FIG. 2B in that (M−N) branches from the (N+1)-th to the M-th branches of the diversity branches correspond to the check bit signals and are used for error-correcting decoding in the error-correcting decoder 116 and that the check bit branches are not finally output as received data.

In the error-correcting decoder 116, the M-branch input data, that is, $V^{M-1}, V^{M-2}, \ldots, V^{M-N}, V^{M-N-1}, \ldots,$ and $V^0$ are regarded as M-bit block data and they are expressed by the polynomial V(X) in a manner similar to the transmitting section.

The polynomial V(X) includes the error pattern E(X) as shown by the above expression (4). The operation of the error-correcting decoding circuit 116 will be explained with reference to FIG. 5.

The received data V(X) consisting of $V^{M-1}, V^{M-2}, \ldots, V^{M-N}, V^{M-N-1}, \ldots,$ and $V^0$ are input to the syndrome computation section 201 within the error decoding circuit 116, and, at the same time, the first N-branch data $V^{M-1}, V^{M-2}, \ldots,$ and $V^{M-N}$ are input to the delay elements 204(1)–204(N).

In the syndrome computation section 201, multiplication according to the generator polynomial represented by the above expression (5) is carried out to obtain a syndrome. The syndrome is output as a read address to the error-correcting pattern generator 202.

As described before, the error-correcting pattern generator 202 has a syndrome table having syndromes as addresses recorded in advance in ROM, and an error pattern corresponding to an input syndrome is read out and output to the EXORs 203(1)–203(N). The read error pattern shows a position of a bit error in the N-bit information block, and an error-correcting pulse "1" is output to the EXOR of the branch corresponding to the bit error and "0" is output to other branches of no bit error.

The received N-branch data $V^{M-1}, V^{M-2}, \ldots, V^{M-N}$ are input to the EXORs 203(1)–203(N) through the delay elements 204(1)–204(N), respectively. Accordingly, the EXORs 203(1)–203(N) each perform exclusive OR (mod2 addition) of the received N-branch data $V^{M-1}, V^{M-2}, \ldots, V^{M-N}$ and the error-correcting pulses output from the error-correcting pattern generator 202. As a result, the N-bit information data $X^{M-1}, X^{M-2}, \ldots, X^{M-N}$ are output as parallel data from the EXORs 203(1)–203(N) to the N delay elements 117(1)–117(N).

The N delay elements 204(1)–204(N) are provided for delaying the information bits by the time required for completing the operations of the syndrome computation section 201 and the error-correcting pattern generator 202. In other words, the N delay elements 204(1)–204(N) have the role of matching the timing of the information bits with the error-correcting pulses at the EXORs 203(1)–203(N).

The N-branch received data output from the error-correcting decoder 116 need the adjustment of the delay differences for time diversity given by the delay elements 102(1)–102(N-1) in the transmitting section as shown in FIG. 3. For this, the information bits $X^{M-1}, X^{M-2}, \ldots, X^{M-N}$ output from the error-correcting decoder 116 are sent to the error-correcting decoder 119 through the delay elements 117(1)–117(N), so that the time differences between the N branches are cancelled. After having passed through the delay elements 117(1)–117(N), the N-branch timing-adjusted data are input to the majority decision circuit 118.

The delay elements 117(1)–117(N), the majority decision circuit 118 and the error-correcting decoder 119 correspond respectively to the delay elements 35(1)–35(N), the majority decision circuit 36 and the error-correcting decoder 37 of the prior-art example as shown in FIG. 2B, and their respective basic operations are the same.

As described above, according to the first embodiment, burst errors caused by a hit or the like due to multipath fading are corrected and further the time diversity is used for error-correction by providing delay differences between branches to reduce in time correlation between branches and performing the error-correction processing between branches. Thus, diversity is utilized as error correcting means not as a simple diversity.

Moreover, by the majority decision processing for taking a majority decision between the branches, a plurality of diversity branch signals are converted into a maximum-likelihood string of data so that bit errors are equivalently restricted to the minimum.

Further, the error-correcting decoding according to the error-correcting encoder 101 is carried out to improve the quality of the channel. Accordingly, in the spread spectrum communication, diversity receiving based on code-division multiplexing becomes possible without using a plurality of fixed antennas or a space diversity or a frequency diversity using an adaptive array.

Further, according to the first embodiment, the error-correcting encoder EC-2 and the error-correcting decoder 116 for carrying out an error-correcting between the diversity branches is added to N-branch diversity signals. Therefore, it is clear that the bit error-correcting improvement effect is increased in this first embodiment as compared with the prior-art example shown as in FIGS. 2A and 2B.

In the majority decision circuit 36 of the prior-art example as shown in FIG. 2B, the probability of bit-error occurrence has been relatively high in the case where majority decisions are divided into two and no decision is made which one is correct.

In contrast, according to the first embodiment, before a majority decision is made, error-correcting decoding is carried out by the error-correcting decoder 116 corresponding to the error-correcting encoder EC-2 in the transmitting section. Therefore, it is possible to make a clear decision as to whether a decision is a majority decision or a minority decision. This has the effect of restricting bit errors.

As explained above, according to the first embodiment, it is possible to solve the problems of the above second publication (that is, the prior-art example shown in FIGS. 2A and 2B).

Next, a second embodiment of the present invention will be described hereinafter referring to FIGS. 6 and 7.

Figure 6:
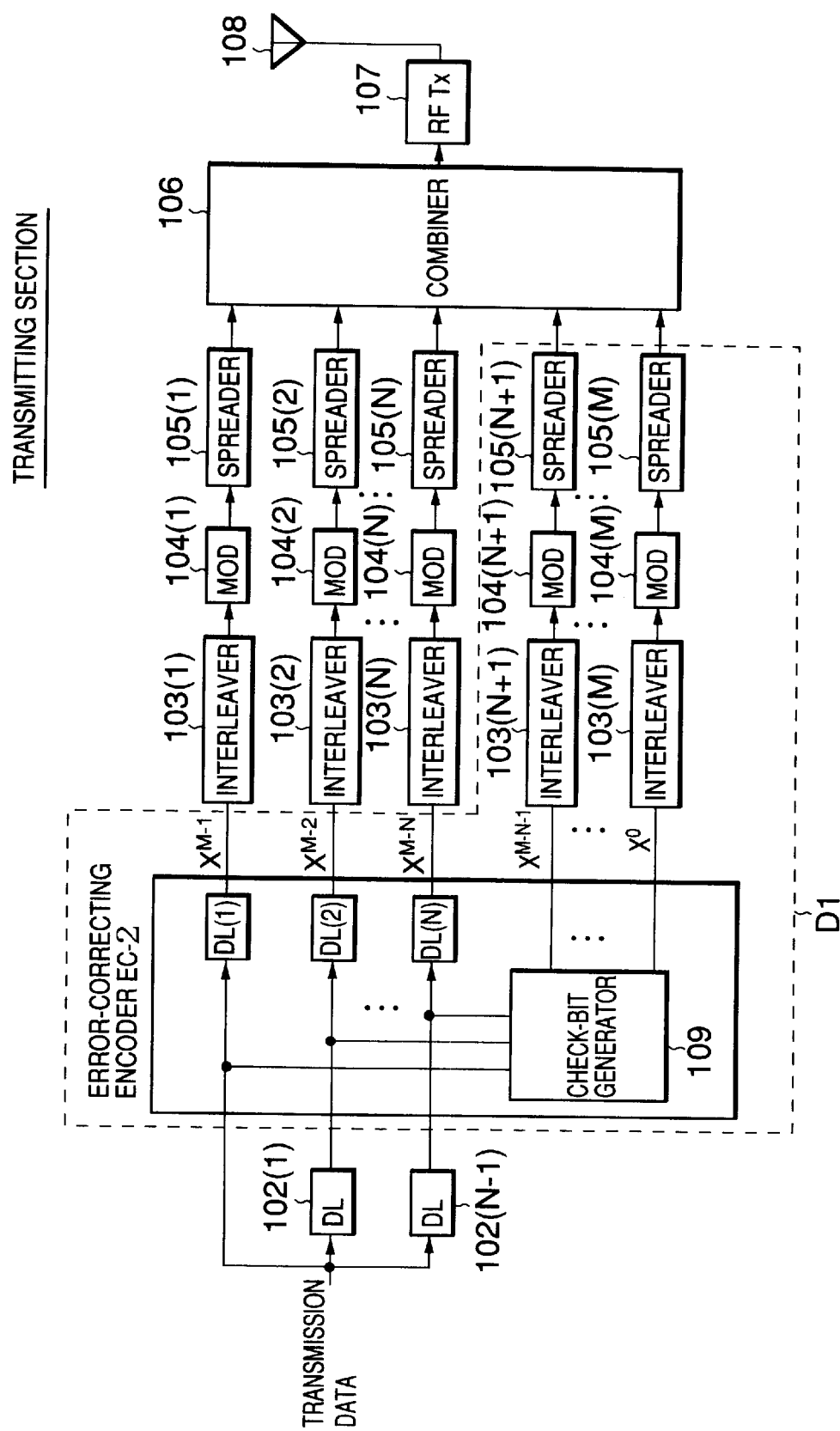
FIG. 6 is a block diagram for showing a circuit of a transmitter in a spread spectrum diversity transceiver according to a second embodiment of the present invention.

Referring to FIG. 6, the structure of a transmitting section according to the second embodiment does not include the error-correcting encoder (EC-1) 101 of FIG. 3, and all the other circuit blocks are the same as those of FIG. 3. Therefore, the same circuit blocks are denoted by the same reference numerals and the descriptions will be omitted.

Referring to FIG. 7, similarly the structure of a receiving section according to the second embodiment does not include the error-correcting decoder 119 of FIG. 4, and all the other circuit blocks are the same as those of FIG. 4. Therefore, the same circuit blocks are denoted by the same reference numerals and the descriptions will be omitted.

According to the second embodiment, the error-correcting encoder (EC-1) 101 and the corresponding error-correcting decoder 119 are not provided in the transmitting and receiving sections, respectively. By adding the error-correcting encoder EC-2, the occurrence of bit error is restricted to the minimum. Further the parallel use of a majority decision circuit 118 substantially improves the bit error-correcting effect.

In the above first embodiment, bit errors are not always deleted completely as described above. However, it is clear that by increasing the diversity branch number N, the bit error-correcting rate is improved by the majority decision and the inter-branch bit error-correcting.

Accordingly, in the second embodiment, it is possible to improve the quality of channels even if the error-correcting encoder (EC-1) 101 and the error-correcting decoder 119 are removed from the first embodiment. Moreover, by removing the error-correcting encoder (EC-1) 101 and the error-correcting decoder 119, the error-correcting additional bits become unnecessary, and it becomes possible to secure the quality of the channels by diversity itself without expanding the signal band. In other words, there is a large merit in the aspect of effective utilization of frequency when considering the limited frequency resources.

As explained above, according to the second embodiment, even if the error-correcting encoder 101 is omitted in the transmitting section, a high quality of channel can be obtained in a manner similar to that of the first embodiment. Thus, a sufficient effect can be obtained in the second embodiment as well.

The present invention is not limited to the above first and second embodiments, but any modifications, applications and peripheral techniques within the scope of the technical idea of the present invention are included in the present invention.

For example, it is needless to mention that replacement of materials, changes to set numerical values and increase in the quantity of structural elements are all included within the scope of the technical idea of the present invention.

As described above, the diversity branches are used not only for diversity but for error-correcting. Therefore, it becomes possible to improve the bit error rate before the majority decision. Accordingly, in the majority decision, it is also possible to avoid a majority decision from being divided into two, and, therefore, the accurateness of a majority decision can be increased further and final bit error can be suppressed almost completely.

Further, N-branch information-bit data with different delays are subjected to error-correction so that M-bit coded data is generated. Thus, M-branch diversity signals are interleaved at the transmitting side. At the receiving side, the M-branch received signals are deinterleaved, then the resulting signals are decoded into N-branch information-bit data. The delay differences given to the N-branch information-bit data are canceled and then a majority decision is taken to determine a string of received data. Since the diversity branches are used not only for simple diversity but also as the error correcting means, bit error rate can be improved before the majority decision. Therefore, it is also possible to avoid a majority decision from being divided into two, and, therefore, the accurateness of a majority decision can be increased further and final bit error can be suppressed almost completely.

Since the final bit error can be suppressed almost completely, the error-correcting encoder 101 at the transmitting section and the error-correcting decoder 119 at the receiving section can be removed. Therefore, the error-correcting additional bits for those become unnecessary and it becomes possible to secure the quality of channels by the diversity itself, which has a large effect of effective utilization of frequencies.

What is claimed is:

1. A spread-spectrum transceiver comprising a transmitting section and a receiving section, the transmitting section comprising:

a first delay circuit for delaying a transmission signal with N (N is a positive integer: N>1) different delays to produce N-branch information signals;

an error-correcting encoder for generating M-branch (M is an integer: M>N) transmission signals from the N-branch information signals and N-bit parallel transmission data of the N-branch information signals;

a spreader for producing M-branch spread-spectrum transmission signals using different spreading codes based on the M-branch transmission signals, respectively; and a radio transmitter for transmitting a code-division multiplex signal obtained by combining the M-branch spread-spectrum transmission signals, the receiving section comprising:

a radio receiver for receiving a radio signal to produce M received signals;

a despreader for producing M-branch received signals from the M received signals using the different spreading codes;

an error-correcting decoder for generating N-branch received information signals based on the M-branch received signals;

a second delay circuit for delaying the N-branch received information signals to cancel the different delays of the N-branch received information signals to produce N received information signals; and a determiner for determining a received information signal from the N received information signals.

2. The spread-spectrum transceiver according to claim 1, wherein the error-correcting encoder comprises:
  a check-bit generator for generating (M-N)-bit check data from the N-bit parallel transmission data of the N-branch information signals; and
  a third delay circuit for delaying the N-branch information signals to concurrently generate the N-bit parallel transmission data and the (M-N)-bit check data to produce the M-branch transmission signals.

3. The spread-spectrum transceiver according to claim 2, wherein the error-correcting decoder comprises:
  a syndrome calculator for calculating a syndrome from M-bit parallel data of the M-branch received signals;
  an error-pattern generator for generating an error pattern depending on the syndrome; and
  an error corrector for correcting N-bit parallel information data of the M-bit parallel data based on the error pattern to produce the N-branch received information signals.

4. The spread-spectrum transceiver according to claim 1, wherein the spreader comprises:
  an interleaver for interleaving the M-branch transmission signals to produce M-branch interleaved signals, respectively;
  a primary modulator performing primary modulation of the M-branch interleaved signals to produce M-branch modulated signals; and
  a spread-spectrum modulator for modulating the M-branch modulated signals using the different spreading codes to produce the M-branch spread-spectrum transmission signals, respectively.

5. The spread-spectrum transceiver according to claim 4, wherein the despreader comprises:
  a spread-spectrum demodulator for demodulating the M received signals using the different spreading codes to produce M-branch despread signals;
  a demodulator for demodulating the M-branch despread signals to produce M-branch demodulated signals; and
  a deinterleaver for deinterleaving the M-branch demodulated signals to produce the M-branch received signals.

6. The spread-spectrum transceiver according to claim 1, wherein the determiner comprises:
  a majority decision circuit for determining the received information signal based on a majority logic of the N received information signals.

7. The spread-spectrum transceiver according to claim 1, wherein
  the transmitting section further comprises a second error-correcting encoder for error-correcting an input transmission signal to produce the transmission signal as an error-corrected signal, and
  the receiving section further comprises a second error-correcting decoder for error-correcting the received information signal.

8. A spread-spectrum system comprising a transmitting side and a receiving side,
  the transmitting side comprising:
  a first delay circuit for delaying a transmission signal with N (N is a positive integer; N>1) different delays to produce N-branch information signals;
  an error-correcting encoder for generating M-branch (M is an integer: M>N) transmission signals from the N-branch information signals and N-bit parallel transmission data of the N-branch information signals;
  a spreader for producing M-branch spread-spectrum transmission signals using different spreading codes based on the M-branch transmission signals, respectively; and
  a radio transmitter for transmitting a code-division multiplex signal obtained by combining the M-branch spread-spectrum transmission signals to the receiving side, and
  the receiving side comprising:
  a radio receiver for receiving the code-division multiplex signal from the transmitting side to produce M received code-division multiplex signals;
  a despreader for producing M-branch received signals from the M received code-division multiplex signals using the different spreading codes;
  an error-correcting decoder for generating N-branch received information signals based on the M-branch received signals;
  a second delay circuit for delaying the N-branch received information signals to cancel the different delays of the N-branch received information signals to produce N received information signals; and
  a determiner for determining a received information signal from the N received information signals.

9. The spread-spectrum system according to claim 8, wherein the error-correcting encoder comprises:
  a check-bit generator for generating (M−N)-bit check data from the N-bit parallel transmission data of the N-branch information signals; and
  a third delay circuit for delaying the N-branch information signals to concurrently generate the N-bit parallel transmission data and the (M-N)-bit check data to produce the M-branch transmission signals.

10. The spread-spectrum system according to claim 9, wherein the error-correcting decoder comprises:
  a syndrome calculator for calculating a syndrome from M-bit parallel data of the M-branch received signals;
  an error-pattern generator for generating an error pattern depending on the syndrome; and
  an error corrector for correcting N-bit parallel information data of the M-bit parallel data based on the error pattern to produce the N-branch received information signals.

11. The spread-spectrum system according to claim 8, wherein the spreader comprises:
  an interleaver for interleaving the M-branch transmission signals to produce M-branch interleaved signals, respectively:
  a primary modulator performing primary modulation of the M-branch interleaved signals to produce M-branch modulated signals; and
  a spread-spectrum modulator for modulating the M-branch modulated signals using the different spreading codes to produce the M-branch spread-spectrum transmission signals, respectively.

12. The spread-spectrum system according to claim 11, wherein the despreader comprises:
  a spread-spectrum demodulator for demodulating the M received signals using the different spreading codes to produce M-branch despread signals;
  a demodulator for demodulating the M-branch despread signals to produce M-branch demodulated signals; and
  a deinterleaver for deinterleaving the M-branch demodulated signals to produce the M-branch received signals.

13. The spread-spectrum system according to claim 8, wherein the determiner comprises:
  a majority decision circuit for determining the received information signal bases on a majority logic of the N received information signals.

14. A communication method comprising the steps of:

at a transmitting side, a) delaying a transmission signal with N (N is a positive integer: N>1) different delays to produce N-branch information-bit signals;

b) generating K-branch (K is a positive integer: K>1) check-bit signals from the N-branch information-bit signals; and c) transmitting M-branch (M=N+K) signals consisting of the N-branch information-bit signals and the K-branch check-bit signals, and at a receiving side, d) receiving the M-branch signals from the transmitting side;

e) reproducing the N-branch information-bit signals from the M-branch signals using the K-branch check-bit signals;

f) canceling the different delays of the N-branch information signals to produce N information signals; and g) determining a received information signal from the N information signals.

15. The communication method according to claim 14, wherein in the step b), the K-branch check-bit signals are generated by dividing a message polynomial M(X) representing N-bit information parallel data of the N-branch information-bit signals by a generator polynomial G(X).

16. The communication method according to claim 15, wherein the step e) comprises:

calculating a syndrome from M-bit parallel data of the M-branch signals;

generating an error pattern depending on the syndrome; and correcting N-bit parallel information data of the M-bit parallel data based on the error pattern to produce the N-branch information-bit signals.

17. The communication method according to claim 14, wherein in the step g), the received information signal is determined based on a majority logic of the N received information signals.

18. A communication method in a spread-spectrum system, comprising the steps of:

at a transmitting side, a) delaying a transmission signal with N (N is a positive integer: N>1) different delays to produce N-branch information signals;

b) generating M-branch (M is an integer: M>N) transmission signals from the N-branch information signals and N-bit parallel transmission data of the N-branch information signals;

c) producing M-branch spread-spectrum transmission signals using different spreading codes based on the M-branch transmission signals, respectively; and d) transmitting a code-division multiplex signal obtained by combining the M-branch spread-spectrum transmission signals to the receiving side, and at a receiving side, e) receiving the code-division multiplex signal from the transmitting side to produce M received code-division multiplex signals;

f) producing M-branch received signals from the M received code-division multiplex signals using the different spreading codes;

g) generating N-branch received information signals based on the M-branch received signals;

h) delaying the N-branch received information signals to cancel the different delays of the N-branch received information signals to produce N received information signals; and i) determining a received information signal from the N received information signals.

19. The communication method according to claim 18, wherein the step b) comprises the steps of:

generating (M−N)-bit check data from the N-bit parallel transmission data of the N-branch information signals; and delaying the N-branch information signals to concurrently generate the N-bit parallel transmission data and the (M−N)-bit check data to produce the M-branch transmission signals.

20. The communication method according to claim 19, wherein the step g) comprises the steps of:

calculating a syndrome from M-bit parallel data of the M-branch received signals; and generating an error pattern depending on the syndrome; and correcting N-bit parallel information data of the M-bit parallel data based on the error pattern to produce the N-branch received information signals.

21. The communication method according to claim 18, wherein the step c) comprises the steps of:

interleaving the M-branch transmission signals to produce M-branch interleaved signals, respectively;

performing primary modulation of the M-branch interleaved signals to produce M-branch modulated signals; and modulating the M-branch modulated signals using the different spreading codes to produce the M-branch spread-spectrum transmission signals, respectively.

22. The communication method according to claim 21, wherein the step f) comprises the steps of:

demodulating the M received signals using the different spreading codes to produce M-branch despread signals;

demodulating the M-branch despread signals to produce M-branch demodulated signals; and deinterleaving the M-branch demodulated signals to produce the M-branch received signals.

23. The communication method according to claim 18, wherein the step i) comprises the step of determining the received information signal based on a majority logic of the N received information signals.

* * * * *